UNITED STATES PATENT OFFICE.

SAMUEL W. RAMSEY, OF YOUNGSTOWN, OHIO.

COMPOSITION FOR FINISHING PLASTERED SURFACES.

1,127,514. Specification of Letters Patent. Patented Feb. 9, 1915.

No Drawing. Application filed February 27, 1914. Serial No. 821,533.

*To all whom it may concern:*

Be it known that I, SAMUEL W. RAMSEY, a citizen of the United States of America, residing at Youngstown, in the county of Mahoning and State of Ohio, have invented certain new and useful Improvements in Compositions for Finishing Plastered Surfaces; and I hereby declare the following to be a full, clear, and exact description of the invention, such as will enable others skilled in the art to which it pertains to make and use the same.

This invention relates to a new and improved composition for forming a finish on plastered walls, ceilings and the like.

The object of this invention is to provide a composition of this character which can be cheaply prepared, readily applied, and which will produce a fine hard finish.

With this object in view, my invention consists in providing the composition hereinafter described in the specification, and particularly pointed out in the accompanying claims.

In preparing my composition I take a quantity of hydrated lime, gypsum and tartaric acid, preferably in the following proportions by weight:—

| | |
|---|---|
| Hydrated lime | 74 parts |
| Gypsum | 25 parts |
| Tartaric acid | 1 part |
| | 100 parts |

The lime is slaked and screened so as to remove all impurities and the gypsum and tartaric acid are then added and thoroughly commingled.

When applying the finish sufficient water is added so that the composition will have the proper consistency to allow it to be readily spread upon the surface of a wall, ceiling or the like.

This composition when applied forms a very fine finish or surface which is much harder than the ordinary lime finish and almost equal to a cement finish.

I do not limit myself to the exact proportions specified as these may be varied to a certain extent without materially departing from my invention.

What I claim is:—

1. A composition for forming a finish on plastered surfaces consisting of seventy four parts hydrated lime, twenty five parts gypsum and one part tartaric acid.

2. A composition for forming a finish on plastered surfaces consisting of seventy four parts hydrated lime, twenty five parts gypsum, one part tartaric acid and sufficient water to reduce the composition to a pasty condition.

In testimony whereof, I sign the foregoing specification, in the presence of two witnesses.

SAMUEL W. RAMSEY.

Witnesses:
ROBT. L. MATTHEWS,
CHAS. FURNESS.

Copies of this patent may be obtained for five cents each, by addressing the "Commissioner of Patents, Washington, D. C."